United States Patent
Tinianov et al.

(10) Patent No.: US 7,908,818 B2
(45) Date of Patent: Mar. 22, 2011

(54) METHODS OF MANUFACTURING ACOUSTICAL SOUND PROOFING MATERIALS WITH OPTIMIZED FRACTURE CHARACTERISTICS

(75) Inventors: Brandon D. Tinianov, Santa Clara, CA (US); Kevin J. Surace, Sunnyvale, CA (US); Albert C. Yanez, Tracy, CA (US)

(73) Assignee: Serious Materials, Inc., Sunnyvale, CA (US)

( * ) Notice: Subject to any disclaimer, the term of this patent is extended or adjusted under 35 U.S.C. 154(b) by 105 days.

(21) Appl. No.: 12/117,687

(22) Filed: May 8, 2008

(65) Prior Publication Data

US 2009/0280356 A1    Nov. 12, 2009

(51) Int. Cl.
*E04B 1/00* (2006.01)

(52) U.S. Cl. .................... 52/746.1; 52/309.3

(58) Field of Classification Search ........... 52/309.3, 52/782.1, 309.1, 309.4, 309.5, 309.8, 309.9, 52/309.13, 309.14; 156/366, 497
See application file for complete search history.

(56) References Cited

U.S. PATENT DOCUMENTS

| | | |
|---|---|---|
| 2,811,906 A | 11/1957 | Chappell |
| 3,160,549 A | 12/1964 | Caldwell et al. |
| 3,215,225 A | 11/1965 | Kirschner |
| 3,336,710 A | 8/1967 | Raynes |
| 3,399,104 A | 8/1968 | Ball III et al. |
| 3,424,270 A | 1/1969 | Hartman et al. |
| 3,462,899 A | 8/1969 | Sherman |
| 3,579,941 A | 5/1971 | Tibbals |
| 3,642,511 A | 2/1972 | Cohn et al. |
| 3,828,504 A | 8/1974 | Egerborg et al. |
| 4,003,752 A | 1/1977 | Isohata et al. |
| 4,112,176 A | 9/1978 | Bailey |
| 4,156,615 A | 5/1979 | Cukier |
| 4,311,767 A * | 1/1982 | Kennedy ............... 428/537.7 |
| 4,347,912 A | 9/1982 | Flocke et al. |
| 4,375,516 A | 3/1983 | Barrall |
| 4,487,793 A | 12/1984 | Haines, Jr. et al. |
| 4,618,370 A | 10/1986 | Green et al. |
| 4,642,951 A | 2/1987 | Mortimer |
| 4,663,224 A | 5/1987 | Tabata et al. |
| 4,678,515 A | 7/1987 | Green et al. |
| 4,685,259 A | 8/1987 | Eberhart et al. |
| 4,759,164 A | 7/1988 | Abendroth et al. |

(Continued)

FOREIGN PATENT DOCUMENTS

CA    2219785 A1    10/1996

(Continued)

OTHER PUBLICATIONS

English Language Abstract, JP Patent First Publication No. 09-203153, Aug. 5, 1997, (2 pages).

(Continued)

*Primary Examiner* — David Dunn
*Assistant Examiner* — Mark R Wendell
(74) *Attorney, Agent, or Firm* — Haynes & Boone, LLP (57) ABSTRACT

Laminated structures for use in building construction are fabricated by a manufacturing process such that the laminating steps to not require elevated drying temperatures or an extended dwell time at any point. The process employs stock materials that simultaneously reduce cost and improve performance. This is accomplished using a specially formulated viscoelastic glue and ambient temperature drying apparatus. As a result, the production capacity of the manufacturing facility, cost of goods, and delivered performance are greatly improved over existing methods.

27 Claims, 6 Drawing Sheets

U.S. PATENT DOCUMENTS

| | | | |
|---|---|---|---|
| 4,778,028 A | 10/1988 | Staley | |
| 4,786,543 A | 11/1988 | Ferm | |
| 4,924,969 A | 5/1990 | K'Heureux | |
| 4,956,321 A | 9/1990 | Barrall | |
| 4,967,530 A | 11/1990 | Clunn | |
| 5,016,413 A | 5/1991 | Counihan | |
| 5,026,593 A | 6/1991 | O'Brien | |
| 5,033,247 A | 7/1991 | Clunn | |
| 5,063,098 A | 11/1991 | Niwa et al. | |
| 5,110,660 A | 5/1992 | Wolf et al. | |
| 5,125,475 A | 6/1992 | Ducharme et al. | |
| 5,158,612 A | 10/1992 | Savoly et al. | |
| 5,240,639 A | 8/1993 | Diez et al. | |
| 5,256,223 A | 10/1993 | Alberts et al. | |
| 5,258,585 A | 11/1993 | Juriga | |
| 5,334,806 A | 8/1994 | Avery | |
| 5,342,465 A | 8/1994 | Bronowicki et al. | |
| 5,368,914 A | 11/1994 | Barrett | |
| 5,439,735 A | 8/1995 | Jamison | |
| 5,473,122 A | 12/1995 | Kodiyalam et al. | |
| 5,474,840 A | 12/1995 | Landin | |
| 5,502,931 A | 4/1996 | Munir | |
| 5,535,920 A | 7/1996 | Blair, Jr. et al. | |
| 5,603,192 A | 2/1997 | Dickson | |
| 5,629,503 A | 5/1997 | Thomasen | |
| 5,643,666 A | 7/1997 | Eckart et al. | |
| 5,664,397 A | 9/1997 | Holz | |
| 5,691,037 A | 11/1997 | McCutcheon et al. | |
| 5,695,867 A | 12/1997 | Saitoh et al. | |
| 5,768,841 A | 6/1998 | Swartz et al. | |
| 5,824,973 A | 10/1998 | Haines et al. | |
| 5,867,957 A | 2/1999 | Holtrop | |
| 5,910,082 A | 6/1999 | Bender et al. | |
| 5,945,208 A | 8/1999 | Richards et al. | |
| 5,954,497 A | 9/1999 | Cloud et al. | |
| 6,077,613 A | 6/2000 | Gaffigan | |
| 6,123,171 A | 9/2000 | McNett et al. | |
| 6,213,252 B1 | 4/2001 | Ducharme | |
| 6,240,704 B1 | 6/2001 | Porter | |
| 6,266,427 B1 | 7/2001 | Mathur | |
| 6,286,280 B1 | 9/2001 | Fahmy et al. | |
| 6,290,021 B1 | 9/2001 | Strandgaard | |
| 6,309,985 B1 | 10/2001 | Virnelson et al. | |
| 6,342,284 B1 | 1/2002 | Yu et al. | |
| 6,381,196 B1 | 4/2002 | Hein et al. | |
| 6,389,771 B1 | 5/2002 | Moller | |
| 6,443,256 B1 | 9/2002 | Baig | |
| 6,632,550 B1 | 10/2003 | Yu | |
| 6,676,744 B2 | 1/2004 | Merkley et al. | |
| 6,699,426 B1 | 3/2004 | Burke | |
| 6,715,241 B2 | 4/2004 | Gelin et al. | |
| 6,758,305 B2 | 7/2004 | Gelin et al. | |
| 6,790,520 B1 | 9/2004 | Todd et al. | |
| 6,800,161 B2 | 10/2004 | Takigawa et al. | |
| 6,803,110 B2 | 10/2004 | Drees et al. | |
| 6,815,049 B2 | 11/2004 | Veeramasuneni et al. | |
| 6,822,033 B2 | 11/2004 | Yu et al. | |
| 6,825,137 B2 | 11/2004 | Fu et al. | |
| 6,877,585 B2 | 4/2005 | Tinianov | |
| 6,913,667 B2 | 7/2005 | Nudo et al. | |
| 6,920,723 B2 | 7/2005 | Downey | |
| 6,941,720 B2 | 9/2005 | DeFord et al. | |
| 7,041,377 B2 | 5/2006 | Miura et al. | |
| 7,068,033 B2 | 6/2006 | Sellers et al. | |
| 7,181,891 B2 | 2/2007 | Surace et al. | |
| 7,197,855 B2 | 4/2007 | Della Pepa | |
| 7,254,894 B1* | 8/2007 | Halpert | 33/1 B |
| 2004/0005484 A1* | 1/2004 | Veeramasuneni et al. | 428/703 |
| 2004/0016184 A1 | 1/2004 | Huebsch et al. | |
| 2004/0168853 A1 | 9/2004 | Gunasekera et al. | |
| 2004/0214008 A1 | 10/2004 | Dobrusky et al. | |
| 2005/0103568 A1 | 5/2005 | Sapoval et al. | |
| 2005/0130541 A1* | 6/2005 | Shah | 442/386 |
| 2006/0048682 A1 | 3/2006 | Wagh et al. | |
| 2006/0057345 A1 | 3/2006 | Surace et al. | |
| 2006/0059806 A1 | 3/2006 | Gosling et al. | |
| 2006/0108175 A1 | 5/2006 | Surace et al. | |
| 2007/0094950 A1 | 5/2007 | Surace et al. | |
| 2007/0102237 A1 | 5/2007 | Baig | |
| 2007/0107350 A1 | 5/2007 | Surace et al. | |
| 2009/0107059 A1* | 4/2009 | Kipp et al. | 52/144 |
| 2009/0239429 A1* | 9/2009 | Kipp et al. | 442/1 |
| 2010/0047461 A1* | 2/2010 | Colbert | 427/372.2 |
| 2010/0116405 A1* | 5/2010 | Kipp et al. | 156/39 |

FOREIGN PATENT DOCUMENTS

| | | |
|---|---|---|
| EP | 1154087 B1 | 11/2001 |
| JP | 09-203153 A | 8/1997 |
| WO | 96/34261 A1 | 10/1996 |
| WO | 97/19033 A1 | 5/1997 |
| WO | 00/24690 A1 | 5/2000 |

OTHER PUBLICATIONS

*A Study of Techniques To Increase The Sound Of Insulation Of Building Elements,* Wyle Laboratories, Prepared for Dept. of Housing and Urban Development, Jun. 1973 (16 pages).
*Field Sound Insulation Evaluation of Load-Beating Sandwich Panels for Housing,* Final Report, Prepared by Robert E. Jones, Forest Products Laboratory, Forest Service, U.S. Department of Agriculture, Aug. 1975 (53 pages).
*Sound Studio Construction On A Budget,* F. Alton Everest, McGraw-Hill, 1997 (7 pages).
*Wood Handbook/Wood as an Engineering Material,* United States Department of Agriculture, Forest Service, General Technical Report FPL-GTR-113, Mar. 1999 (24 pages).
*Transmission Loss Of Plasterboard Walls* by T.D. Northwood, Building Research Note, Division of Building Research, National Research Counsel, Ottawa, Canada, Jan. 19, 1970 (10 pages).
*A Guide to Airborne, Impact, and Structureborne Noise Control in Multifamily Dwellings,* U.S. Department of Housing and Urban Development, Prepared for the National Bureau of Standards, Washington, D.C., Jan. 1963 (5 pages).
*Transmission Loss of Leaded Building Materials,* Paul B. Ostergaard, Richmond L. Cardinell, and Lewis S. Goodfriend, The Journal Of the Acoustical Society Of America, vol. 35, No. 6, Jun. 1963 (7 pages).
*Dictionary of Architecture & Construction 2200 illustrations,* Third Edition, Edited By Cyril M. Harris, Professor Emeritus Of Architecture Columbia University, McGraw-Hill, 2000 (7 pages).
*Dictionary of Engineering Materials,* Harald Keller, Uwe Erb, Wiley-Interscience by John Wiley & Sons, Inc. 2004 (4 pages).
*Chamber Science and Technology Dictionary,* by Professor Peter M.B. Walker, W & R Chambers Ltd and Cambridge University Press, 1988 (3 pages).
Noise and Vibration Control Engineering: *Principles and Applications,* Eric E. Ungar; Edited by Leo Beranek and Instvan Ver, Chapter 11, John Wiley & Sons, Inc., 1992, (12 pages).
Handbook of *Acoustical Measurements and Noise Control,* Edited by Cyril Harris, Chapter 32; Structureborne Sound Isolation, Chapter 33; Noise Control In Buildings, McGraw-Hill, Inc., 1991, (30 pages).
"Green Glue is your soundproofing solution and noise reduction material", www.greengluecompany.com.(2 pages), retrieved on Nov. 9, 2006.
Acoustical: *A Sound Approach to Testing,* www.archest.com/pages, 2000 (2 pages).
STC - *Sound Transmission Class - Discussion And Use,* www.sota.ca/stc_info.htm (3 pages), Aug. 13, 2003.
ASTM International, Designation: C 1396/C 1396M-04, *Standard Specification For Gypsum Board,* 2004 (7 pages).
Barbara C. Lippiatt, National Institute of Standards and Technology. BEES 3.0, "Building For Environmental And Economic Sustainability Technical Manual and User Guide", Oct. 2002, (198 pages).
Takada, et al., *Effect in Reducing Floor Impact Noise Of Recycled Paper Damper Members,* Bulletin of Tokyo Metropolitan Industrial Technology Research Institute, No. 2 (1999) [certified English translation] (13 pages).
*Architectural Acoustics,* M. David Egan, J. Ross Publishing (Reprint 2007) p. 211; originally published McGraw-Hill, 1988 (5 pages).
Hastings, Mardi C.; Godfrey, Richard; Babcock, G. Madison, *Application Of Small Panel Damping Measurements To Larger Walls,* Proc. SPIE vol. 2720, pp. 70-76, Smart Structures and Materials 1996: Passive Damping and Isolation (7 pages).

van Vuure, A.W.; Verpoest, I., Ko, F.K., *Sandwich-Fabric Panels As Spacers In A Constrained Layer Structural Damping Application,* Composites Part B 32 (2001) 11-19, Elsevier Science Ltd. (9 pages).

Noise and Vibration Control, Revised Edition, pp. 306-315, Institute of Noise Control Engineering, 1988, Beranek, Leo L. (editor) (9 pages).

Noise and Vibration Control, Chapter Fourteen, *Damping of Panels,* Ungar, Eric E., pp. 434-473, McGraw-Hill, 1971, Beranek, Leo L. (editor) (9 pages).

Nashif, Ahid D.; Jones, David I. G.; Henderson, John P., *Vibration Damping,* pp. 290-305, John Wiley & Sons, 1985 (18 pages).

Architectural Acoustics, Principles and Practice, John Wiley & sons, 1992, Cavanaugh, William J. and Wilkes, Joseph A. (editors) (350 pages).

FIRE Resistance Design Manual, Sound Control, Gypsum Association, GA-600-94 (14$^{th}$ Ed.) (116 pages), 1994.

FIRE Resistance Design Manual, Sound Control, Gypsum Association, GA-600-97 (15$^{th}$ Ed.) (128 pages), 1997.

FIRE Resistance Design Manual, Sound Control, Gypsum Association. GA-600-2000 (16$^{th}$ Ed.) (139 pages), 2000.

Noxon, Arthur M., *The Chain Is As Strong As Its Weakest Link,* An article written for the first Hong Kong HiFi Show, 1993, Translated and Published in Chinese, http://www.acousticsciences.com/articles/chain.htm (7 pages).

*Quiet Lightweight Floor Systems,* Reprint from Sound and Vibration Magazine, Jul. 1992, by David A. Harris, Building & Acoustic Design Consultants (7 pages).

Dynamat materials http://web.archive.orc/web/20010525113753/www.admteschusa.com/Dynamat.html Jun. 12, 2007, ADM Tech - Dynamic Control (15 pages).

Noise Killer: Pro Damping Compound Materials http://www.tnt-audio.com/clinica/noise.html May 18, 2007, 1998 (3 pages).

Waybackmachine search results for Jan 1, 1996—Jun. 12, 2007 (1 page).

Unified Facilities Criteria (UFC) *Noise And Vibration Control,* UFC 3-450-01. 15 May 200, Department of Defense (156 pages).

United States Gypsum, *Architectural And Construction Services, Design Data for Acousticians,* Feb. 1986 (4 pages).

*A Study Of Techniques To Increase The Sound Of Insulation Of Building Elements,* Wyle Laboratories, Prepared for Dept. of Housing and Urban Development, Jun. 1973 (12 pages).

dB-Ply materials Sound Reducing Panels from Greenwood Forest Products, Inc., Apr. 24, 1997 (9 pages).

dB-Rock materials OMNI Products, Inc. (3 pages), Sep. 22, 1988.

ASC WallDamp materials from Acoustic Sciences Corporation http://web.archive.org/web/20021013031149/www.asc-soundproof.com/index-walldamp May 18, 2007 (21 pages).

Nordisk Akustik A/S materials, http://web.archive.orq/web/200206240933724/www.nordisk-akustik.dk/html_uk/prod03.ht . . . Jun. 11, 2007, (4 pages).

IES 2000 *Dampening and Visocelastic Membranes* (Jul. 2, 2003) Atlanta.com/product (pp. 1-6).

Waybackmachine search results for Jan 1, 1996 - May 3,2006 (1 page).

"*Damping of plate flexural vibrations by means of viscoelastic laminae*" by D. Ross, E.E. Ungar, and E.M. Kerwin - Structural Damping, Section III, ASME, 1959, New York (41 pages).

Vandersall, H. L., "*Intumescent Coating Systems, Their development and Chemistry*" J. Fire & Flammability, vol. 2 (Apr. 1971) pp. 97-140 (45 pages).

\* cited by examiner

METHODS OF MANUFACTURING ACOUSTICAL SOUND PROOFING MATERIALS WITH OPTIMIZED FRACTURE CHARACTERISTICS

CROSS REFERENCE TO RELATED APPLICATIONS

This application is related to commonly-assigned U.S. patent application Ser. No. 10/658,814 filed 8 Sep. 2003, by K. Surace and M. Porat, now U.S. Pat. No. 7,181,891, issued 27 Feb. 2007 titled "ACOUSTICAL SOUND PROOFING MATERIAL AND METHODS FOR MANUFACTURING SAME", to U.S. patent application Ser. No. 11/697,691 filed 9 Apr. 2007 by B. Tinianov, titled "ACOUSTICAL SOUND PROOFING MATERIAL WITH IMPROVED FRACTURE CHARACTERISTICS AND METHODS FOR MANUFACTURING SAME", and to U.S. patent application Ser. No. 11/770,476 filed 12 Jun. 28, 2007 by B. Tinianov and K. Surace, titled "METHODS OF MANUFACTURING ACOUSTICAL SOUND PROOFING MATERIAL", which are incorporated herein by reference.

BACKGROUND

Currently, the manufacture of bulky and/or heavy laminated panels for use in building construction requires a large area for manufacturing. In addition to the bulk associated with the material in-process, the area required for manufacturing is increased by any process step requiring the material be staged for a long period of time. For a given throughput of material, the area needed increases with additional processing steps and with a longer processing time at any step.

For example, the laminated structure disclosed in the aforementioned U.S. Pat. No. 7,181,891 comprises two external layers of a non-metallic material (which in one embodiment are paper faced sheets of gypsum wallboard), and an internal constraining layer, attached to each other by adhesive layers of viscoelastic glue. In some embodiments other materials are incorporated between the outer gypsum layers. In one embodiment the process of manufacturing a laminar structure, for example the structure disclosed in the '891 patent, includes drying a completed structure whilst pressure is applied to the structure. Depending upon the materials that make up the laminar structure, a dwell time (defined as the time required for a single process step) of several hours to a few days is required for the adhesive to properly dry, during which time other similar individual structures may be constructed which also require a dwell time of several hours to a few days to dry. The long drying time is due to the time required for liquid in the adhesive to soak into the gypsum sheets, the gypsum sheets then transporting the liquid to the surrounding environment via evaporation. A significant volume of material is staged at the drying step in the described construction sequence, the volume depending upon the production rate. As a result, a large drying chamber corresponding to the volume of a single structure multiplied by the finished product throughput desired and the dwell time of the instant step is required. Further, some steps of the manufacturing process may require that the drying chamber be maintained at a specified elevated temperature and low relative humidity, an energy intensive requirement.

For example, a production demand of one thousand finished four-foot by eight foot by one-inch structures per day, with a dwell time at a certain step requiring forty-eight hours of drying at a constant temperature of 120 to 140 degrees Fahrenheit, a relative humidity of about thirty per cent, and a constant airflow requires a staging area providing the required environmental conditions for two thousand structures at any given time, such staging area providing a minimum of 25 feet of vertical clearance on an approximately 25 foot by 45 foot footprint, amounting to 28,125 cubic feet of conditioned space. When manufacturing demands more than one thousand finished panels per day, even more drying volume is required. Any other process steps also requiring significant dwell time similarly increase the facilities needed for a given manufacturing throughput. A long cycle time, defined as the time required to construct a finished structure from start to finish, also extends the time required for a manufacturing operation to respond to an increase in demand for the manufactured product.

Another critical aspect of the existing manufacturing processes is that the outer layers of the laminated panel (in one embodiment, paper faced gypsum wallboard) consist of complete and finished forms of traditional building materials. It has been demonstrated by U.S. patent application Ser. No. 11/697,691, that for embodiments employing gypsum wallboard, it is preferable if there is no facing paper on the interior surfaces that are in contact with the viscoelastic glue. In U.S. patent application Ser. No. 11/697,691 it was proposed that the panels to be combined into the laminated soundproof panel be manufactured or sourced so as not to have a durable paper across one face. This is difficult in practice because the paper faces (on either side of the gypsum wallboard panel) serve as a durable, wear resistant surface and also significantly improve the bending stiffness of the gypsum wallboard. Without paper on one surface, the modified gypsum wallboard is particularly susceptible to damage and/or destruction during transport and handling.

A second concern with these modified, paperless gypsum wallboard source materials is that their manufacture is difficult, driving their prices higher than the prices of traditional panels. Also, only a few manufacturers are able to produce these modified materials and as a result, the material supply for the laminated panels may be limited.

What is needed is a manufacturing method for an easily scored and snapped laminar structure wherein intermediate process staging of product during manufacture is minimized and raw material costs are greatly reduced.

SUMMARY

A laminar structure comprising a sandwich of a plurality of materials is constructed using process methods wherein the dwell time at certain steps is reduced from hours or days to a few minutes. In one embodiment adhesive is dried prior to adding any additional layers to the laminated build-up, eliminating the lengthy process step of drying the complete laminated structure. The adhesive is dried by blowing gas across the surface of the specifically formulated adhesive immediately after the adhesive is applied, forming a pressure sensitive adhesive ("PSA"). The next layer in the sandwich may then be applied with no further drying time required. In one embodiment the individual process dwell times and total cycle time are shortened enough to permit construction of complete laminar structures using a conveyor belt type assembly line apparatus, wherein no in-process material is staged or stacked up.

Additionally, the process employs a novel manufacturing step in which a stock gypsum wallboard panel is bisected along its thickness to produce two congruent halves that lack paper on their interior surfaces. This step reduces the raw of the stock materials and for a laminated panel in accordance with this invention maintains or improves the fracture characteristics of the laminated panel (ability to score and snap the panel).

This invention will be more fully understood in view of the following drawings and written description.

DESCRIPTION OF SOME EMBODIMENTS

Definitions

| Term | Definition |
| --- | --- |
| Cycle time | Total time duration required to manufacture a single article. |
| Dwell time | Time duration required for a single process step. |
| Staging | Holding material at a certain process step for a given dwell time. |
| Stock gypsum wallboard | Standard faced drywall panel used as feedstock material for the laminated panel manufacturing process. The panel may be faced on four sides by paper, fiberglass mat, or another suitable material. |
| Sandwich | A stack comprising the materials (continuous or not continuous) forming a laminate structure which may be incomplete or complete at an instant point in a process sequence. |
| PSA | Pressure sensitive adhesive; a type of adhesive which does not require drying time after a new layer of material is brought into contact with the adhesive. |

A laminar substitute for drywall comprises a sandwich of two outer layers of selected thickness gypsum board or other material which are glued to each other, using a sound dissipating adhesive wherein the sound dissipating adhesive is applied in a certain pattern to all or less than all of the interior surfaces of the two outer layers. In one embodiment, the adhesive layer is a specially formulated QUIETGLUE (QuietGlue)® 320 adhesive, which is a viscoelastic material, of a specific thickness. QUIETGLUE(QuietGlue)® 320 adhesive is available from Serious Materials, Inc., of Sunnyvale, Calif. Typically, QUIETGLUE (QuietGlue)® 320 adhesive is made of the materials as set forth in Table 1.

TABLE 1

QuietGlue 320

| COMPONENTS | WEIGHT % | | |
| --- | --- | --- | --- |
| | Min | Max | Preferred |
| acrylate polymer | 33.00% | 70.00% | 60.00% |
| ethyl acrylate, methacrylic acid, polymer with ethyl-2-propenoate | 0.05% | 3.00% | 0.37% |

TABLE 1-continued

QuietGlue 320

| COMPONENTS | WEIGHT % | | |
| --- | --- | --- | --- |
| | Min | Max | Preferred |
| hydrophobic silica | 0.00% | 0.50% | 0.21% |
| paraffin oil | 0.10% | 5.00% | 1.95% |
| silicon dioxide | 0.00% | 0.50% | 0.13% |
| sodium carbonate | 0.01% | 1.50% | 0.66% |
| stearic acid, aluminum salt | 0.00% | 0.50% | 0.13% |
| surfactant | 0.00% | 1.50% | 0.55% |
| rosin ester | 1.00% | 9.00% | 4.96% |
| water | 25.00% | 40.00% | 30.87% |
| 2-Pyridinethiol, 1-oxide, sodium salt | 0.00% | 0.50% | 0.17% |

The preferred formulation is but one example of a viscoelastic glue. Other formulations may be used to achieve similar results and the range given is an example of successful formulations investigated. Formed on the interior surfaces of the two gypsum boards, the adhesive layer is about 1/16 inch thick. In various embodiments a differing number of layers of material of differing composition are sandwiched between the outer gypsum boards, each layer glued to adjoining layers by PSA. In the following discussion "adhesive", "glue", and "PSA" may be used interchangeably to refer to a layer of material in the context of a laminar structure sandwich. In this written description, PSA always refers to a layer of viscoelastic glue which has been dried to form a viscoelastic pressure sensitive adhesive.

Figure 1:
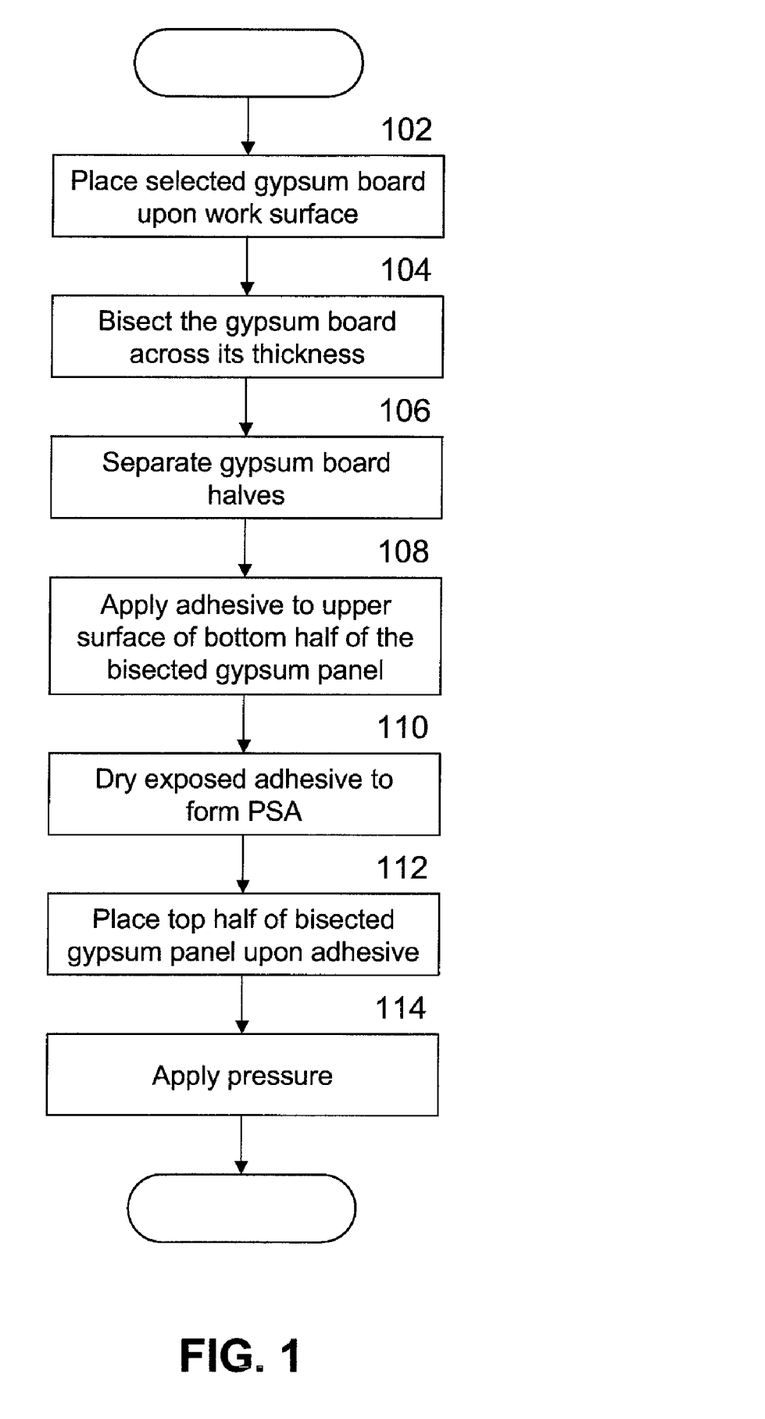
FIG. 1 is an example of a process sequence in accordance with the present invention.

Referring to FIG. 1, an example of a process flow 100 according to the present invention is presented. Any references to top and bottom layers is to be understood to refer only to these layers as described in the context of FIGS. 2 through 5 and not in the context of any orientation in the use of the structure or alternative assembly orientations. Step 102 specifies a stock material in the form of a gypsum wallboard. This material is common to the building industry and consists of a gypsum or gypsum and fiber enhanced composite core surrounded by a layer of paper bonded to the core. Typically the short edges are left with the gypsum core exposed. The gypsum wallboard is typically 4 feet wide by 8 feet long, though lengths of 9, 10, and 12 feet are common as well. The gypsum sheet can range in thickness from about 1/4 inch thick to over one inch thick. Such products are commonly available in the construction materials field and are manufactured by USG Corporation of Chicago, Ill., the National Gypsum Company, of Charlotte, N.C., and Saint-Gobain, of Courbevoie, France.

Figure 2:
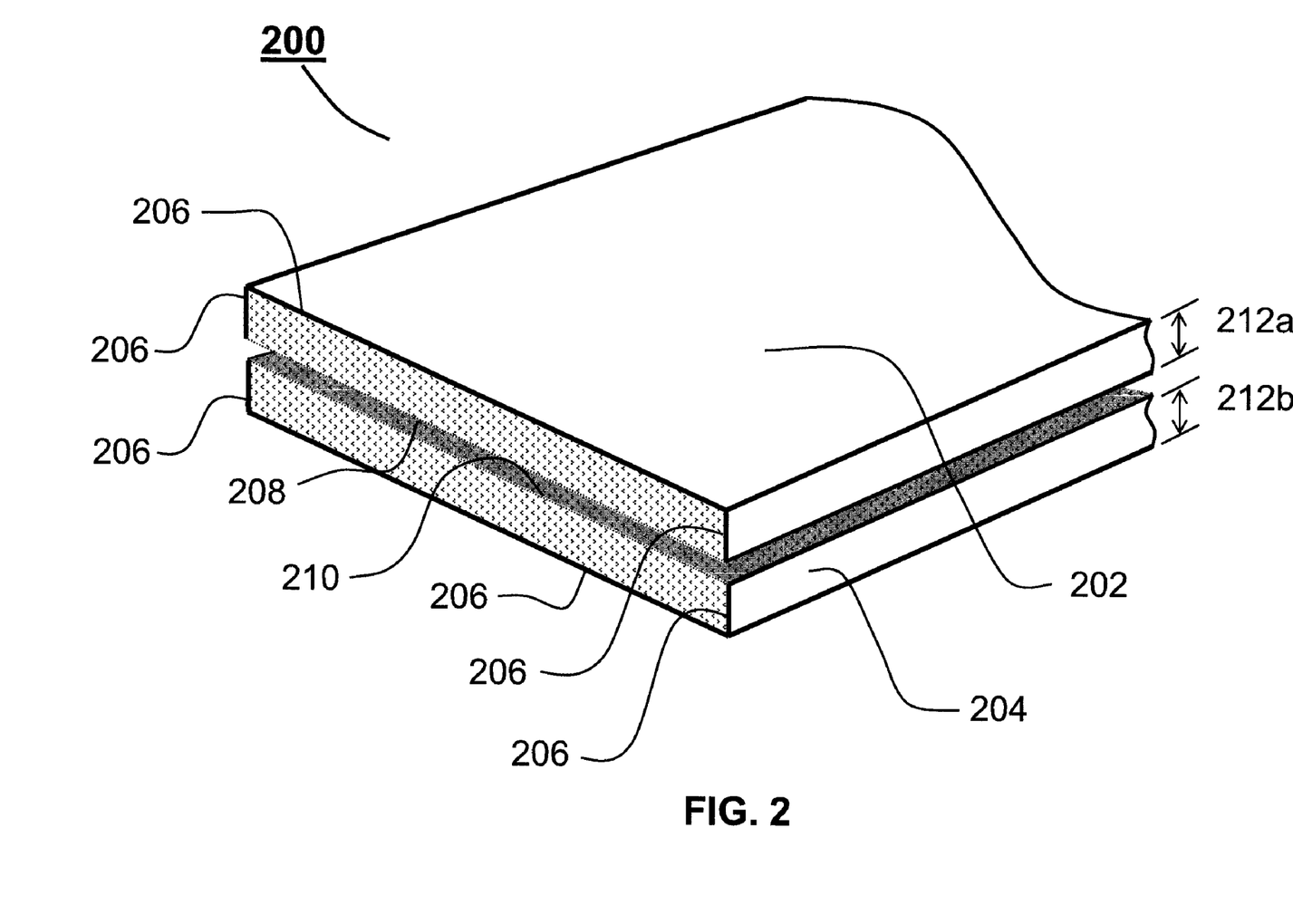
FIG. 2 shows a bisected stock gypsum wallboard panel.

Manufacturing process step 104 specifies that the gypsum wallboard is bisected across its thickness. The resulting cut panel is shown in perspective in FIG. 2. In FIG. 2, article 200 represents the bisected panel. A first half 202 is separated from the second half 204 by a means shown in FIG. 3. Halves 202 and 204 may be of equal thickness or unequal thickness 212a and 212b, depending on the requirements of the final laminated assembly. It can be seen in the figure that the paper 206 extends about the exterior of panel 200, but not the interior surfaces 208 and 210 exposed by the separation process.

The novel bisection of the gypsum core offers two important advantages over the existing methods. First, a single bisected sheet is significantly less expensive than a comparable laminate of two sheets of half thickness. For example, 5/8 inch thick sheets of 4 foot wide by 8 foot long type x gypsum have a wholesale price of approximately $150 per one thousand square feet (msf). A 5/16 inch thick panel, also 4 foot wide by 8 foot long, has a wholesale price of approximately $125 to $150 per one thousand square feet. However, without bisection, two 5/16 inch thick sheets are required to replace every bisected 5/8 inch thick panel. Therefore, in this example, the cost of the laminated gypsum wallboard is $150 msf for the bisected panel verses about $250 to $300 msf for a stacked pair of 5/16 inch thick panels. The bisection novelty saves approximately 40% to 50% of the panel material costs. A second advantage is that the bisection technique allows for optimum fracture characteristics (as described in U.S. patent application Ser. No. 11/697,691) but without non-standard outer layers of material. This allows for much greater variability in sourcing feed stock panels. As a result, the novel manufacturing method has better material supply and pricing.

Figure 3A:
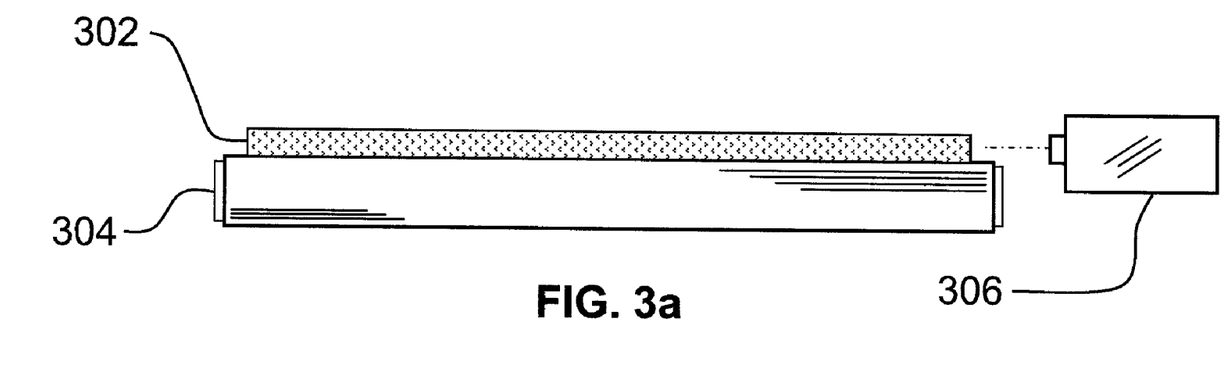
FIGS. 3a and 3b show methods of bisecting the gypsum wallboard stock panels.
Figure 3B:
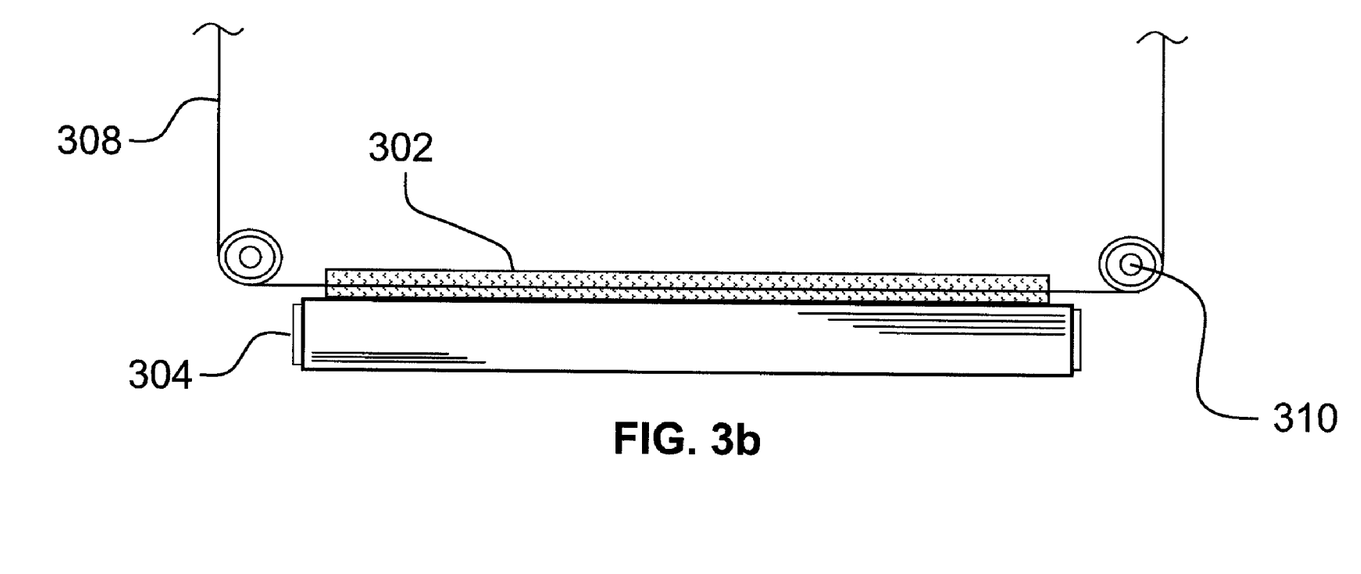

FIGS. 3a and 3b show two exemplary methods for bisecting the stock gypsum wallboard panel. FIG. 3a depicts the stock gypsum wallboard panel 302 resting on a platform, rollers, conveyor belt, or other suitable support 304. At the right side of the FIG. 3a, 306 depicts a high intensity laser used for cutting the panel without direct contact. Suitable commercial panel cutting equipment is available, such as a high-intensity CO2 laser based on the CS0405 ceramic cutting laser manufactured by Han's Laser Technology Company, of Houston, Tex. This method has proven viable as a method of panel bisection in limited production trials.

FIG. 3b again depicts the stock gypsum wallboard panel 302 resting on a platform, rollers, conveyor belt, or other suitable support 304. Across the face of the panel is a mechanical cutting device in the form of a saw blade 308 and a motorized support structure such as a band saw tool 310. Suitable commercially-available panel cutting equipment includes the Bavaria SL 130i mobile sawmill manufactured by SERRA Maschinenbau GmbH of Rimsting, Germany. This saw has a linear traversing head attached to a rigid panel support structure. Trials employing the SL 130i were able to bisect the gypsum panel at a rate of approximately thirteen feet per minute. This rate is consistent with the improved manufacturing rates disclosed herein.

Following the panel's bisection, the panels are separated in process step 106 so that lower panel half 204 may be coated in part or entirely with glue by an appropriate means from above as specified by process step 108. The top portion of the bisected panel 204 is best lifted using a distributed vacuum suction cup system. Commercially available vacuum assist systems are the Saugerspinne and the VacuMaster Light vacuum assisted lifting devices manufactured by J. Schmalz GmbH of Glatten, Germany.

Figure 4:
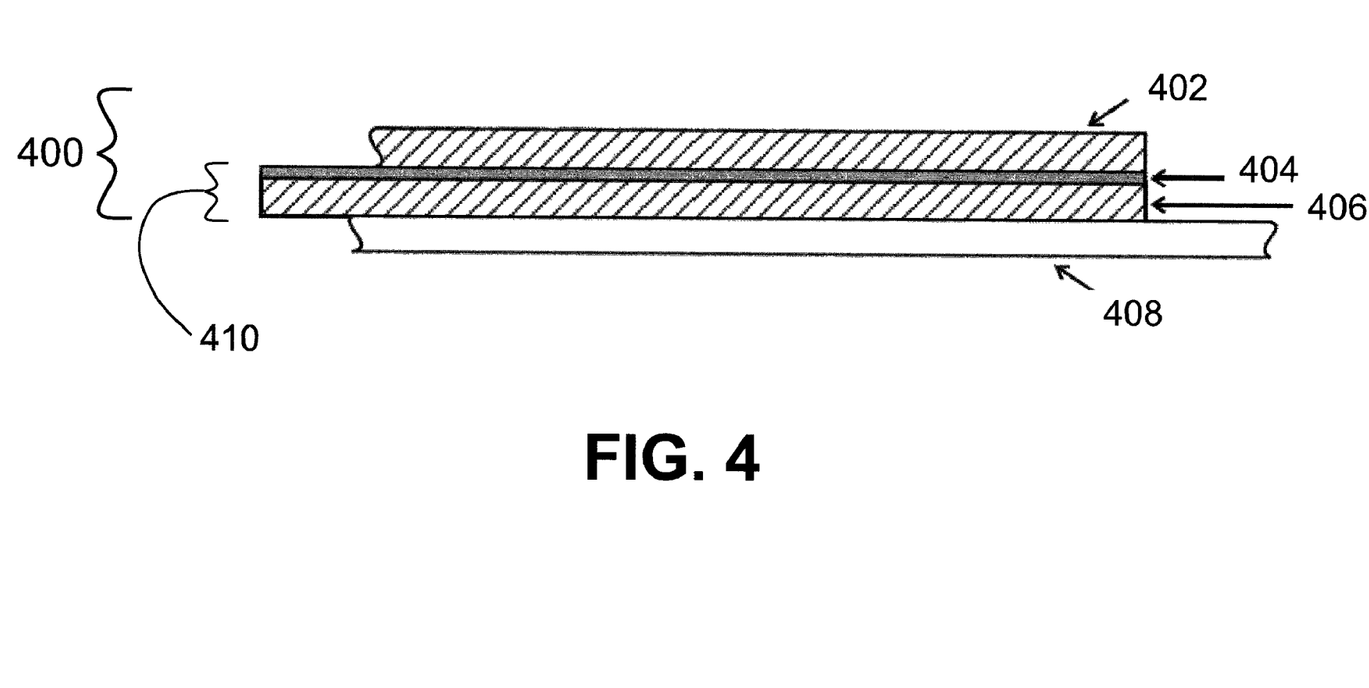
FIGS. 4 and 5 show a side view of a laminated sound attenuating structure fabricated by methods in accordance with this invention.

FIG. 4 shows a bottom gypsum board 406 of a selected thickness placed upon a work surface 408. As noted earlier, in some embodiments the work surface 408 is a conveyor belt for moving the material through the process steps, for example a one hundred foot OAL ACSI Model 190RB roller bed belt conveyor, available from Conveyor Systems & Engineering, Inc., Elk Grove, Ill. A gypsum board 206 may be placed onto the work surface 408 using overhead lifting equipment with vacuum cups, or by a worker simply picking up a panel 406 and putting it in the proper place. An elevating apparatus may move gypsum boards to the level of the work surface. An adhesive 404, for example QUIETGLUE(QuietGlue)® 320 adhesive, is applied with full or partial coverage to the upper surface of the bottom gypsum board 406. If coated partially with glue, any one of a number of selected glue patterns can be used including stripes, random patterns, and any other appropriate geometric shapes. The adhesive 404 may be applied using a roller, (similar to a paint roller), a brush, a broad knife, or sprayed on with dispensing nozzles. The adhesive 404 may cover the entire upper surface of the gypsum 406, or, in some embodiments, less than all of the surface may have adhesive 404 applied, for example as disclosed in aforementioned U.S. patent application Ser. No. 11/734,770. The bottom gypsum layer 406 with the applied adhesive 404 forms an intermediate sandwich structure 410.

Next, the adhesive 404 is dried as described in manufacturing process step 110, so that the resulting moisture content in the adhesive is no greater than five percent by weight.

In one embodiment, a layer of viscoelastic glue at a thickness between one thirty second inch (1/32") and one eighth inch (1/8") on a panel of material four (4) feet by eight (8) feet was subjected to a flow of ambient air (typically between nineteen degrees centigrade (19° C.) and twenty four degrees centigrade (24° C.) at about fifty thousand cubic feet per minute (50,000 ft$^3$/minute). The initial moisture content of the viscoelastic glue was about thirty percent (30%) by weight and after about five minutes of air flow the moisture content had been reduced to about five percent (5%) by weight.

Figure 6:
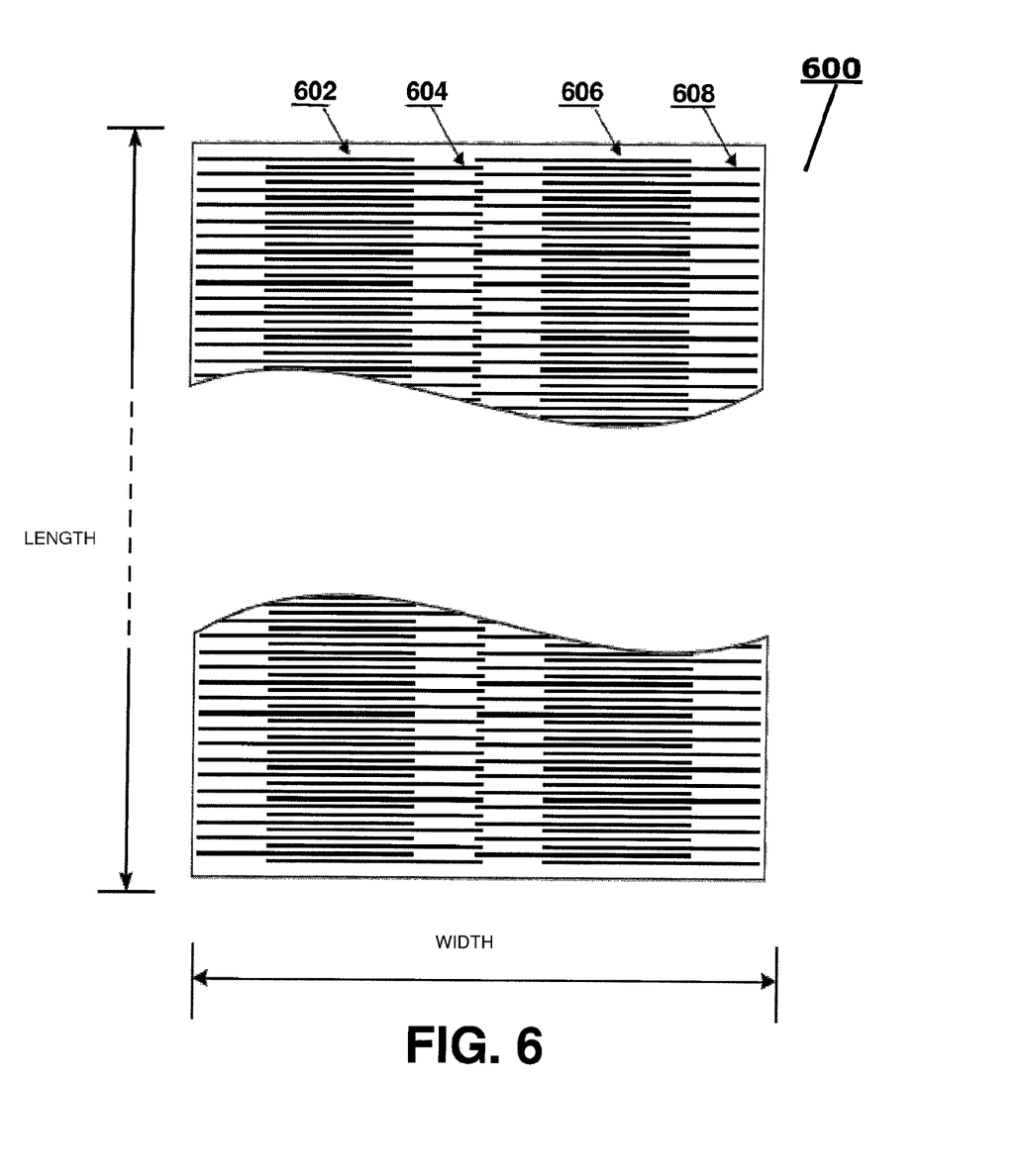
FIG. 6 shows a diffuser panel with a plurality of lateral openings (of which openings 602 to 608 are shown) for passing a drying gas to be used to convert a viscoelastic glue with moisture into a viscoelastic pressure sensitive adhesive ("PSA").

A variety of methods may be used to dry the adhesive 404. In one embodiment the sandwich with exposed adhesive 410 is passed under a gas diffuser, wherein a volume of gas, for example fifty cubic feet per minute of air, is provided through openings in the diffuser located between about one (1) inch and one (1) foot above the glue. In some embodiments the provided gas is ambient air. In other embodiments the provided gas is preheated and/or dehumidified air. The gas-blowing system comprises a plenum chamber (not shown) for receiving pressurized gas from a blower, the pressurized gas subsequently flowing out through openings in the diffuser onto the surface of the exposed adhesive. FIG. 6 illustrates an example of a diffuser panel 600. Diffuser panel 600 faces the sandwich 410 as the sandwich 410 passes underneath the diffuser (assuming a conveyor belt method). In the example shown, openings 602, 604, 606, 608 are approximately eighteen inches long (in the short direction of the panel 600), one eighth of an inch wide, on one-half inch centers, staggered by five to six inches and the glue layer passes from one (1) inch to one (1) foot below the diffuser. Other designs for diffuser panel 600 openings may be used, for example uniformly distributed small holes.

In one embodiment the intermediate panel sandwich 410 is moved on a conveyor belt 408 at ten feet per minute about six (6) toe eight (8) inches under a gas diffuser panel 600, wherein the diffuser 600 is four feet wide and twenty-four feet long (in the direction of belt travel). The adhesive is therefore exposed to the flowing gas of ambient temperature air, approximately 70 degrees Fahrenheit and 30% relative humidity for approximately 2.4 minutes. The exact exhaust area and shape of the diffuser 400 and the openings are not critical, providing the exhaust area of the diffuser 600 permits the desired gas flow, and provided further that the exhaust area of diffuser panel 600 is low enough such that the plenum chamber has adequate back pressure to provide an approximately even flow of gas out of the diffuser. In one embodiment the gas flow is approximately 50,000 cubic feet per minute.

In one embodiment wherein a conveyor belt is not used, the intermediate panel sandwich 410 is placed upon a work surface 408, which may or may not be the same work surface upon which the panel 210 was placed for application of the adhesive 404, and wherein a diffuser 600 approximating the size and shape of the panel sandwich 410 and approximately aligned over the panel sandwich blows gas over the exposed adhesive, for example air at approximately seventeen feet per second velocity with about 50,000 cubic feet per minute volume. An important parameter in the process is the degree of dryness of the adhesive attained in transforming the adhesive 404 into a PSA. For a specific implementation according to the method of the present invention, the combination of drying time, gas flow rate, diffuser panel 600 opening area, temperature and humidity of the gas provided through the diffuser 600, and the thickness of the adhesive 404 are adjusted to provide a suitable liquid content in transforming the adhesive 404 into a PSA, for example five per cent liquid by weight as measured with a moisture sensor such as the MW 3260 microwave moisture sensor manufactured by Tews Electronik of Hamburg, Germany. Assuming these factors are reasonably constant, the drying time is used as a predetermined time for drying step 110. If the adhesive is completely dried the next material in the sandwich may not stick to it. A liquid content of approximately five percent provides a tacky adhesive that has good adhesion characteristics but does not require further drying after the sandwich is assembled in manufacturing process step 112.

Figure 5:
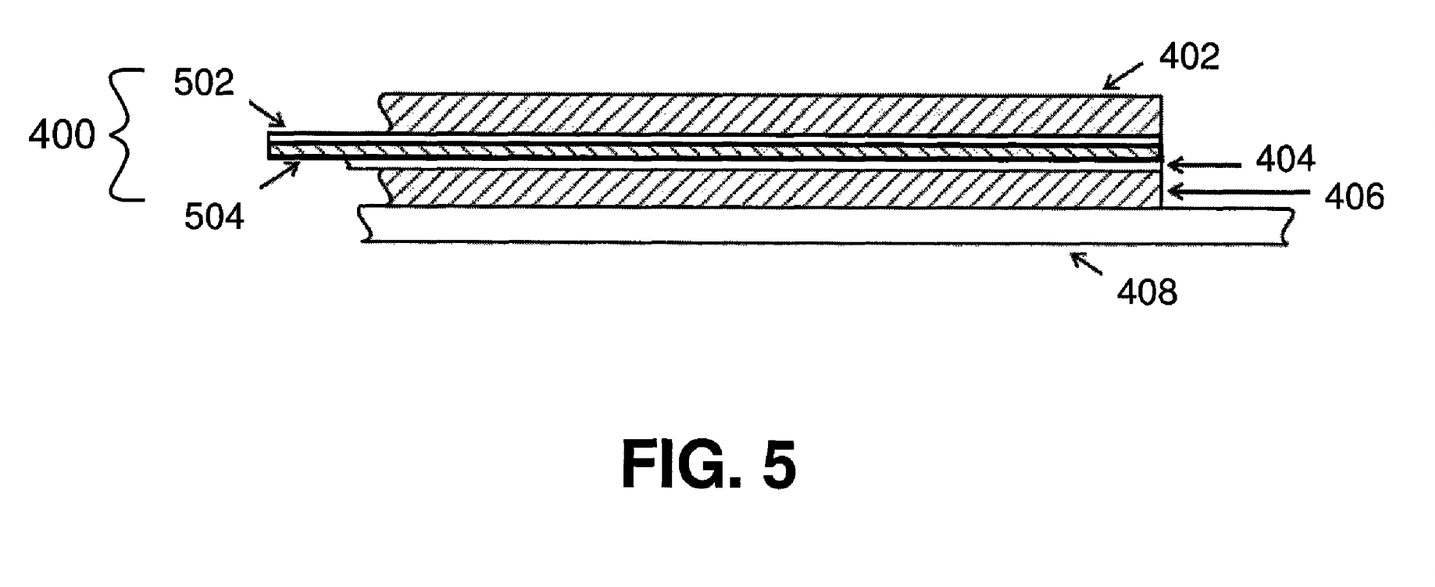

Referring to FIG. 5, in some structures to be constructed using the method of the present invention, there are additional layers of material 504 between the two outer panels of, for example, gypsum board 402, 406. Examples include vinyl, sheet metal, plywood, and gypsum, as discussed more expansively in the aforementioned U.S. Pat. No. 7,181,891. If such an option is selected, the additional material 504 is placed upon the sandwich 410 at step 112 (that is, upon the exposed PSA 204), then adhesive 502 is applied to the exposed surface of the newly placed material 504 at step 104, as before. The adhesive 502 is dried to form a PSA at step 106 and another option for an additional layer is considered at step 110. If no more material layers 504 are to be added the process continues with step 112 wherein a top gypsum board 402 is placed upon the PSA 502 to complete the sandwich to create assembly 400.

The fully-assembled laminated structure 400 is pressed together at step 114. In one embodiment the laminated structure 400 is passed under a six-inch diameter roller (or the roller may instead be passed over the laminated structure 400) weighing approximately fifty pounds at approximately ten feet per minute. Following the application of pressure at step 114 the laminated structure 400 is complete and ready for shipping; no further drying or other manufacturing process step is required.

While the process has been described as drying the viscoelastic glue to essentially create a viscoelastic pressure sensitive adhesive, the process can also be used to partially dry the viscoelastic glue thereby to shorten the time that the stacked structure, when fully assembled, must be placed in a drying chamber to remove additional moisture from the viscoelastic glue used to join together the several layers of material.

The foregoing description of some embodiments of the invention has been presented for the purposes of illustration and description. The description is not intended to be exhaustive or to limit the invention to the precise forms disclosed. Many modifications and variations will be apparent to one skilled in the relevant art.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

Unless expressly stated otherwise herein, ordinary terms have their corresponding ordinary meanings within the respective contexts of their presentations, and ordinary terms of art have their corresponding regular meanings.

What is claimed is:

1. A method of forming a laminated structure appropriate for use in constructing walls, floor, ceilings or doors, said laminated structure comprising a flat panel having a selected thickness and area, said method comprising:
   bisecting and separating a gypsum wallboard across its thickness to
   provide a first external layer including a first surface and a second surface;
   applying a layer of viscoelastic glue which includes moisture to said first surface;
   flowing gas over said glue for a predetermined time to remove a selected amount of moisture from said glue; and
   placing a second layer of material onto the layer of glue wherein the glue is between said first and second layers, thereby joining said first external layer to said second layer.

2. The method of claim 1 wherein said second layer of material is an external layer of said laminated structure.

3. The method of claim 2 including applying pressure to the laminated structure following the placing of said second layer on said glue.

4. The method of claim 1 including drying said gas prior to flowing said gas over said adhesive.

5. The method of claim 1 wherein said first and second external layers of material are manufactured from a single bisected layer.

6. The method of claim 1 including:
   applying a second layer of viscoelastic glue to an exposed surface of said second layer; and
   flowing gas over said second layer of viscoelastic glue for a predetermined time to remove a selected amount of moisture from said glue.

7. The method of claim 6 including drying said gas prior to flowing said gas over said second layer of viscoelastic glue.

8. The method of claim 6 including placing a third layer of material on said second layer of viscoelastic glue after said gas has forced over said second layer of viscoelastic glue for said predetermined time thereby to create said laminated structure.

9. The method of claim 8 including applying a selected pressure to said laminated structure following the placing of said third layer of material on said second layer of viscoelastic glue.

10. A method of forming a laminated panel including at least a first layer of material and a second layer of material, wherein each layer of material is bonded to an adjacent layer of material by viscoelastic glue, said method comprising:
    placing viscoelastic glue in a selected pattern on an exposed surface of a layer of material to which a second layer of material is to be bonded; and further wherein
    the first layer of material and the second layer of material are provided by bisecting and separating a gypsum wallboard across its thickness;
    flowing gas over said viscoelastic glue to remove moisture from said glue; and placing said second layer of material over said viscoelastic glue following the flowing of gas over said viscoelastic glue.

11. The method of claim 10 wherein said viscoelastic glue is placed on said exposed surface in a selected pattern so as to cover less than all of said exposed surface.

12. The method of claim 10 wherein said viscoelastic glue is placed on said exposed surface as a continuous layer.

13. The method of claim 11 wherein said viscoelastic glue has a thickness between one thirty second of an inch (1/32") and one eighth of an inch (1/8").

14. The method of claim 9 wherein said gas is forced over said viscoelastic glue for a sufficient time to bring the moisture content of said viscoelastic glue to below five percent (5%) by weight of the viscoelastic glue.

15. The method of claim 9 wherein said gas is forced over said viscoelastic glue for a sufficient time to bring the moisture content of said viscoelastic glue to between thirty percent (30%) and five percent (5%) by weight of the viscoelastic glue.

16. The method of claim 9 wherein said gas is air.

17. The method of claim 16 wherein said air is at approximately ambient temperature.

18. The method of claim 17 wherein said air is forced across said viscoelastic glue at a flow rate between about ten thousand cubic feet per second and about fifty thousand cubic feet per second.

19. A structure made by the method of claim 9.

20. A structure made by the method of claim 1.

21. The method of claim 11 wherein said selected pattern comprises one or more patterns selected from a group of patterns consisting of circles, squares, rectangles, triangles, stripes, polygons, random shapes, and semicircles.

22. The method of claim 10 wherein said first layer of material is a first layer of gypsum wall board with no paper or other coating on what will be an internal surface of said first layer when said first layer is part of said laminated panel.

23. The method of claim 22 wherein said second layer of material is a second layer of gypsum wall board with no paper or other coating on what will be an internal surface of said second layer when said second layer is part of said laminated panel.

24. A method of forming a laminated structure appropriate for use in constructing walls, floor, ceilings or doors, said method comprising:
  bisecting and separating a gypsum wallboard across its thickness to
  provide a first external layer including a first surface and a second surface;
  applying a layer of viscoelastic glue which includes moisture to at least parts of said first surface;
  flowing gas over said glue for a predetermined time to remove a selected amount of moisture from said glue; and
  placing a second layer of material onto the layer of glue wherein the glue is between said first and second layers, thereby joining said first external layer to said second layer.

25. The method of claim 24 wherein said first external layer of material comprises a portion of a faced gypsum wallboard, said portion being cut in a plane parallel to the front and back surfaces of the wallboard such that said portion has a thickness less than the thickness of said wallboard and retains the normal wallboard facing material on what will be the external surface of said laminated structure and has the interior wallboard material exposed on what will be the surface of said portion parallel to said external surface and internal to said laminated structure.

26. The method of claim 25 wherein the gypsum wallboard is faced with paper or fiberglass mat.

27. The method of claim 24 wherein said viscoelastic glue is applied to all of said first surface.

* * * * *